(12) United States Patent
Miyazaki

(10) Patent No.: US 7,317,381 B2
(45) Date of Patent: Jan. 8, 2008

(54) WHEEL CONDITION MONITORING SYSTEM

(75) Inventor: Toshihiro Miyazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 205 days.

(21) Appl. No.: 10/525,828

(22) PCT Filed: Aug. 29, 2003

(86) PCT No.: PCT/JP03/11097

§ 371 (c)(1),
(2), (4) Date: Feb. 25, 2005

(87) PCT Pub. No.: WO2004/021302

PCT Pub. Date: Mar. 11, 2004

(65) Prior Publication Data

US 2006/0049923 A1    Mar. 9, 2006

(30) Foreign Application Priority Data

Aug. 30, 2002 (JP) .............................. 2002-254478
Aug. 30, 2002 (JP) .............................. 2002-254491

(51) Int. Cl.
*B60R 25/10* (2006.01)

(52) U.S. Cl. .................. 340/426.33; 340/438; 340/442; 340/444; 73/146

(58) Field of Classification Search ........... 340/426.33, 340/438, 442, 444, 445, 447; 73/146, 146.4, 73/146.5

See application file for complete search history.

(56) References Cited

U.S. PATENT DOCUMENTS 6,215,393 B1    4/2001  Delaporte ................... 340/447
6,237,403 B1 *  5/2001  Oldenettel et al. ......... 73/146.5
6,275,148 B1    8/2001  Takamura et al. .......... 340/442
6,604,416 B2 *  8/2003  Tsujita ....................... 73/146.5
6,690,271 B2 *  2/2004  Fischer et al. .............. 340/447

FOREIGN PATENT DOCUMENTS

| EP | A2-1 026 016 | 8/2000 |
|----|---|---|
| EP | A2-1 325 820 | 7/2003 |
| JP | A 04-101597 | 4/1992 |
| JP | U 05-013802 | 2/1993 |
| JP | A 10-006725 | 1/1998 |
| JP | A 2000-238515 | 9/2000 |
| JP | A 2000-355204 | 12/2000 |
| JP | A 2001-264202 | 9/2001 |

* cited by examiner

*Primary Examiner*—Toan N. Pham
(74) *Attorney, Agent, or Firm*—Oliff & Berridge, PLC

(57) ABSTRACT

A wheel condition-monitoring system comprises transmitters (1) installed on individual rotatable wheels, for transmitting conditions of the wheels, and a receiver (11) installed on the side of a vehicle body, for receiving the conditions of the wheels sent from the transmitters. The rotation speed of the wheels are detected, and data that indicate the conditions of the wheels are sent from the transmitters (1) to the receiver (11) at intervals in accordance with the rotation speeds detected, or data that relate to a pressure etc. are sent for a predetermined number of times at a transmission interval of a first cycle that assumes a high speed range. At the same time, data transmission of a predetermined number of times corresponding to the transmission interval of the first cycle is repeated for a predetermined number of times at a transmission interval of a second cycle that assumes a low speed range and is longer than the first cycle. This increases reliability in data transmission and reception, and enables the system to function stably in the presence of a dead point.

16 Claims, 7 Drawing Sheets

WHEEL CONDITION MONITORING SYSTEM

TECHNICAL FIELD

The present invention relates to a wheel condition monitoring system having a transmitter which is installed on an individual rotatable wheel to transmit the condition of the wheel, and a receiver which is installed on the vehicle body side to receive the condition of the wheel sent from the transmitter.

BACKGROUND ART

Conventionally, various types of systems for monitoring the condition of a wheel have been known. One of the systems is, for example, a system for monitoring the internal pressure of a tire, which includes a transmitter consisting of a pressure sensor for detecting the internal pressure of tire, which is one of the conditions of wheel, and a transmission circuit for transmitting the pressure data, and a receiver consisting of a receiving circuit for receiving the pressure data sent from the transmitter, and monitors the internal pressure of tire and gives an alarm etc. to the driver if abnormality is found. These wheel condition monitoring systems are configured so that, taking the internal pressure of tire as an example, the pressure data from the pressure sensors installed on the individual wheels are sent from the individual transmitters to one receiver installed on the vehicle body side. The intensity of electric waves that are sent from the transmitter and reaches an antenna of the receiver changes in accordance with a change in position of the transmitter, which is caused by the rotation of wheel. When the transmitter is present at a certain rotation angle, the receiving intensity of electric waves at the receiver becomes low, so that in some cases, a rotation angle at which the transmission and reception cannot be achieved is present.

FIG. 1 is a diagram for explaining one example of the send and receive conditions in the above-described conventional wheel condition monitoring system. In the example shown in FIG. 1, the relative values of receive intensity are plotted for the rotation angle of wheel (360° for one turn of tire), and data can be transmitted and received stably in a region on the outside of the receive limit. In FIG. 1, it is found that a dead point, at which the receive intensity does not reach the receive limit is present at a right lower portion. FIG. 1 shows a concept of one example, and the position of dead point or the presence of dead point changes according to the tire size, data size, data transmission speed, and the like. The above-described example has a problem in that the demodulation of data is impossible at this dead point. In such a situation, the probability of achieving the transmission and reception decreases, and hence the system does not function stably.

In order to eliminate the hindrance to the transmission and reception of data, which is caused by the above-described dead point, and to increase the probability of transmission and reception, generally, the number of times of transmission has only to be increased. However, in the wheel condition monitoring system relating to the present invention, if the number of times of transmission is increased excessively, there arises a problem in that the following disadvantages are provided.

(1) An increase in the number of times of transmission accelerates the run-down of battery, which shortens the life of transmitter.

(2) An increase in the number of times of transmission causes the transmission to overlap with the transmission of electric waves from another tire in terms of time, which sometimes makes the reception of data impossible.

It is an object of the present invention to provide a wheel condition monitoring system capable of performing a stable function of the system by increasing the probability of the transmission and reception even in the presence of a dead point.

DISCLOSURE OF THE INVENTION

The present invention has been made to achieve the above object, and the principal configuration and operation thereof are described below.

(1) The present invention provides a wheel condition monitoring system having a transmitter which is installed on an individual rotatable wheel to transmit a condition of the wheel and a receiver which is installed on the vehicle body side to receive the condition of the wheel sent from the transmitter, wherein the rotation speed of the wheel is detected, and data indicating the condition of the wheel are sent from the transmitter to the receiver at intervals in accordance with the detected rotation speed of wheel.

According to this wheel condition monitoring system in accordance with the present invention, the system is configured so that transmission is achieved at intervals corresponding to the rotation speed of wheel. Therefore, even if a dead point at which transmission and reception are impossible is present, the probability that transmission and reception can be accomplished by several times of transmission can be increased, and the system can perform its functions stably.

(2) The present invention provides the wheel condition monitoring system according to item (1), wherein when the receiver receives a plurality of pieces of data sent from the transmitter installed on each of a plurality of wheels, first data transmission from the transmitter is performed after each waiting time set for each transmitter has elapsed.

According to this wheel condition monitoring system in which the first data transmission from the transmitter is performed after each waiting time set for each transmitter has elapsed, a problem in that the transmission overlaps with the transmission of electric waves from another wheel in terms of time, which makes the reception of data impossible, arising if this invention is not applied, can be overcome suitably.

(3) The present invention provides the wheel condition monitoring system according to item (1) or (2), wherein the transmitter is provided with an acceleration sensor, and the rotation speed of wheel is determined from the measurement value of the acceleration sensor.

According to this wheel condition monitoring system, by measuring centrifugal acceleration acting on the outside in the radial direction by the acceleration sensor, the rotation speed of wheel can easily be determined from the already-known relationship between the rotation speed of wheel and the measurement value of acceleration sensor, so that the present invention can be achieved suitably.

(4) The present invention provides the wheel condition monitoring system according to any one of items (1) to (3), wherein a transmission interval counter is provided; and a transmission interval corresponding to acceleration determined by the acceleration sensor is set in the transmission interval counter, the transmission interval is counted until the set transmission interval value becomes zero, and transmission is performed at the time when the value becomes zero, by which transmission is achieved at intervals in accordance with the rotation speed of wheel.

According to this wheel condition monitoring system in which transmission is achieved at the intervals corresponding to the rotation of wheel by utilizing the acceleration determined by the acceleration sensor and the transmission interval counter, transmission can be achieved suitably at the intervals corresponding to the rotation speed of wheel.

(5) The present invention provides the wheel condition monitoring system according to any one of items (1) to (4), wherein a transmission number counter is provided; and the number of times of transmission, which has been determined in advance, is set in the transmission number counter, the number of times of transmission is counted until the set number of times of transmission becomes zero, and transmission is finished at the time when the number of times of transmission becomes zero.

According to this wheel condition monitoring system in which the number of times of transmission is controlled by utilizing the transmission number counter, the control of the number of times of transmission can be carried out suitably.

(6) The present invention provides a wheel condition monitoring system having a transmitter which is installed on an individual rotatable wheel to transmit a condition of the wheel and a receiver which is installed on the vehicle body side to receive the condition of the wheel sent from the transmitter, wherein data that indicate the condition of wheel are sent a predetermined number of times at a transmission interval of a first cycle that assumes a high speed range, and also data transmission of a predetermined number of times at the transmission interval of the first cycle is repeated a predetermined number of times at a transmission interval of a second cycle that assumes a low speed range and is longer than the first cycle.

According to this wheel condition monitoring system in accordance with the present invention, a plurality of times of transmissions are performed by combining two transmission intervals of the transmission interval of the first cycle that assumes a high speed range and the transmission interval of the second cycle that assumes a low speed range and is longer than the first cycle. Therefore, even if a dead point at which transmission and reception are impossible is present, the probability that transmission and reception can be accomplished by several times of transmission can be increased, and the system can perform its functions stably.

(7) The present invention provides the wheel condition monitoring system according to item (6), wherein when the receiver receives a plurality of pieces of data sent from the transmitter installed on each of a plurality of wheels, first data transmission from the transmitter is performed after each waiting time set for each transmitter has elapsed.

According to this wheel condition monitoring system in which the first data transmission from the transmitter is performed after each waiting time set for each transmitter has elapsed, a problem in that the transmission overlaps with the transmission of electric waves from another wheel in terms of time, which makes the reception of data impossible, arising if this invention is not applied, can be overcome suitably.

(8) The present invention provides the wheel condition monitoring system according to item (6) or (7), wherein the system is configured so that in the case where the number of times of transmission in the first cycle is 2 or more, the first transmission interval in the first cycle is not the same as the second transmission interval in the first cycle.

According to this wheel condition monitoring system which is configured so that the first transmission interval in the first cycle is not the same as the second transmission interval in the first cycle, the randomness of transmission position of data transmission is increased, and the probability that any transmission position deviates from the dead point can be increased, so that a waste of transmission can be eliminated suitably.

(9) The present invention provides the wheel condition monitoring system according to any one of items (6) to (8), wherein the system is configured so that in the case where the number of times of transmission in the second cycle is 2 or more, the first transmission interval in the second cycle is not the same as the second transmission interval in the second cycle.

According to this wheel condition monitoring system which is configured so that the first transmission interval in the second cycle is not the same as the second transmission interval in the second cycle, the randomness of transmission position of data transmission is increased, and the probability that any transmission position deviates from the dead point can be increased, so that a waste of transmission can be eliminated suitably.

BEST MODE FOR CARRYING OUT THE INVENTION

Figure 2A:
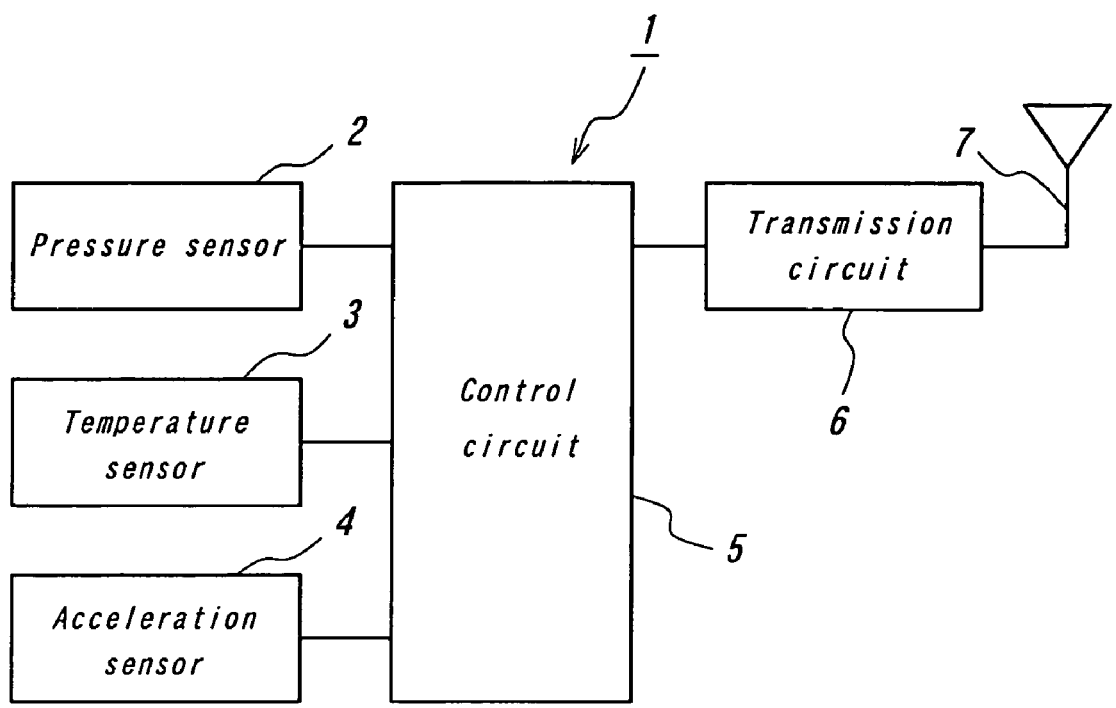
FIG. 2 is a block diagram of configurations of a transmitter and a receiver, which are common to wheel condition monitoring systems in accordance with first and second embodiments of the present invention.
Figure 2B:
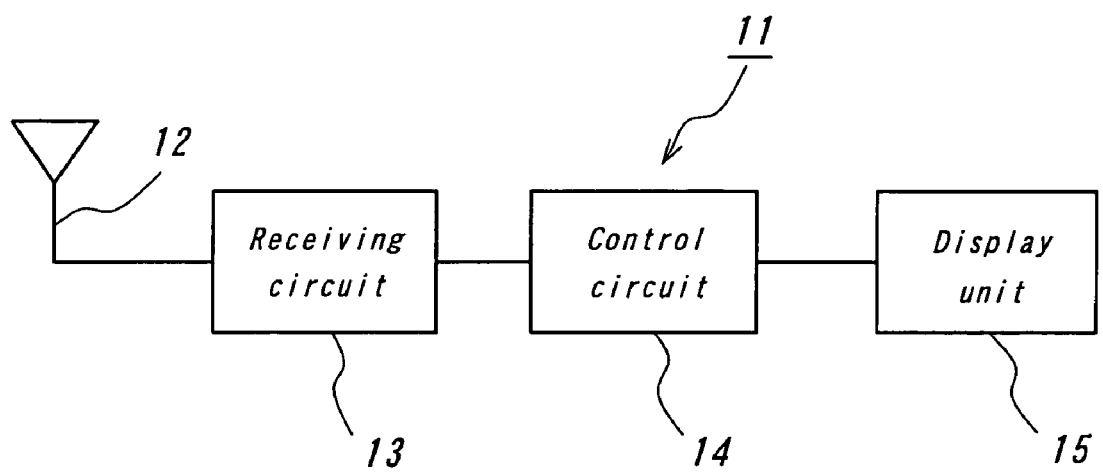

Two embodiments in accordance with the present invention will now be described with reference to the accompanying drawings. First, a configuration common to these embodiments is described. FIGS. 2(a) and 2(b) are block diagrams each showing a configuration of a transmitter and a receiver, which constitute a wheel condition monitoring system in accordance with the present invention.

A transmitter 1 shown in FIG. 2(a) includes a pressure sensor 2 for measuring the pressure in a tire, a temperature sensor 3 for measuring the temperature in the tire, an acceleration sensor 4 for measuring the acceleration of the tire, a control circuit 5 which controls the data measurement intervals in the pressure sensor 2, temperature sensor 3, and acceleration sensor 4 and processes the obtained pressure data, temperature data, and acceleration data, a transmission circuit 6 for transmitting the output sent from the control circuit 5, and an antenna 7 attached to the transmission circuit. The temperature sensor 3 is provided if necessary. Also, the acceleration sensor 4 is essential in a first embodiment, but is not essential in a second embodiment.

A receiver 11 shown in FIG. 2(*b*) includes an antenna 12, a receiving circuit 13 for receiving electric waves including various data sent from the transmitter 1, a control circuit 14 for processing various data received by the receiving circuit 13, and a display unit 15 for displaying the data processed by the control circuit 14 to the driver etc.

Figure 3:
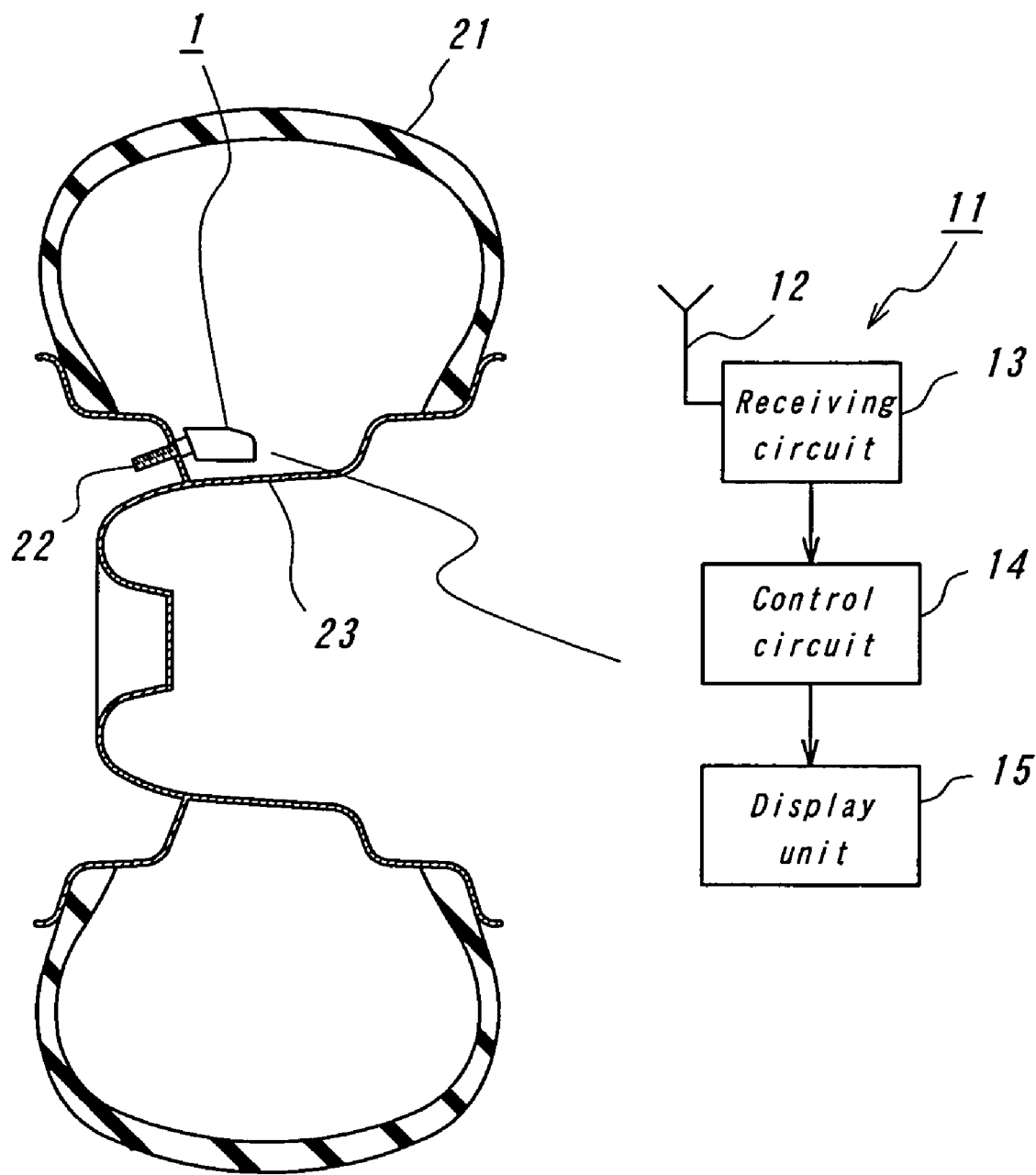
FIG. 3 is a partially sectional view showing one example of a state in which a wheel condition monitoring system in accordance with a first or second embodiment is installed on a vehicle.

FIG. 3 is a partially sectional view showing one example of a state in which the wheel condition monitoring system in accordance with the present invention is installed on a vehicle. In the example shown in FIG. 3, the transmitter 1 consisting of the pressure sensor 2, the temperature sensor 3, the acceleration sensor 4, the control circuit 5, the transmission circuit 6, and the antenna 7, which constitutes the wheel condition monitoring system, is installed on a wheel 23 integrally with a cylindrical valve stem 22 for injecting air into a tire 21. Also, on the vehicle body side, the receiver 11 consisting of the antenna 12, the receiving circuit 13, the control circuit 14, and the display unit 15 is provided. In the wheel condition monitoring system in accordance with the present invention, the transmitter 1 is installed on each of the wheels, and one receiver 11 which receives the pressure data etc. sent from the transmitter 1 and displays that data as necessary is provided on the vehicle body side.

Of the above-described two embodiments having a common configuration, first, the first embodiment is explained below. In the wheel condition monitoring system of the first embodiment, as described above, when the data of the internal pressure in tire etc. is sent from the transmitter to the receiver, the transmission intervals in the case where the same data are transmitted a plurality of times are determined in accordance with the rotation speed of wheel, by which the transmission/reception efficiency is enhanced. Specifically, the rotation speed of wheel is detected by the acceleration determined by the acceleration sensor in the transmitter installed on the tire, and the data are sent at transmission intervals according to the detected rotation speed of wheel.

As one example, Table 1 gives the results of the relationship between the speed of vehicle, time for one rotation (inverse number of rotation speed of wheel), and acceleration (G), which were obtained under the conditions of a tire size of 245/40ZR18, a rim size of 18×8 JJ, a tire outside diameter of 653 (mm), a rim outside diameter of 457 (mm), and one circumference length of 2.05 (m).

TABLE 1

| | Speed of vehicle (km/h) | | | | |
|---|---|---|---|---|---|
| | 25 | 50 | 100 | 200 | 300 |
| Time for one rotation (ms) | 295.5 | 147.8 | 73.9 | 36.9 | 24.6 |
| Acceleration (G) | 11 | 42 | 169 | 675 | 1519 |

From the results shown in Table 1, it is found that the rotation speed of wheel correlates with the acceleration and further with the speed of vehicle. Because of this fact, from the acceleration detected by the acceleration sensor installed on the wheel, the rotation speed of wheel is found based on the unequivocal relationship between the rotation speed of wheel and the acceleration, so that the transmission interval in accordance with the rotation speed of wheel can be determined.

Figure 4:
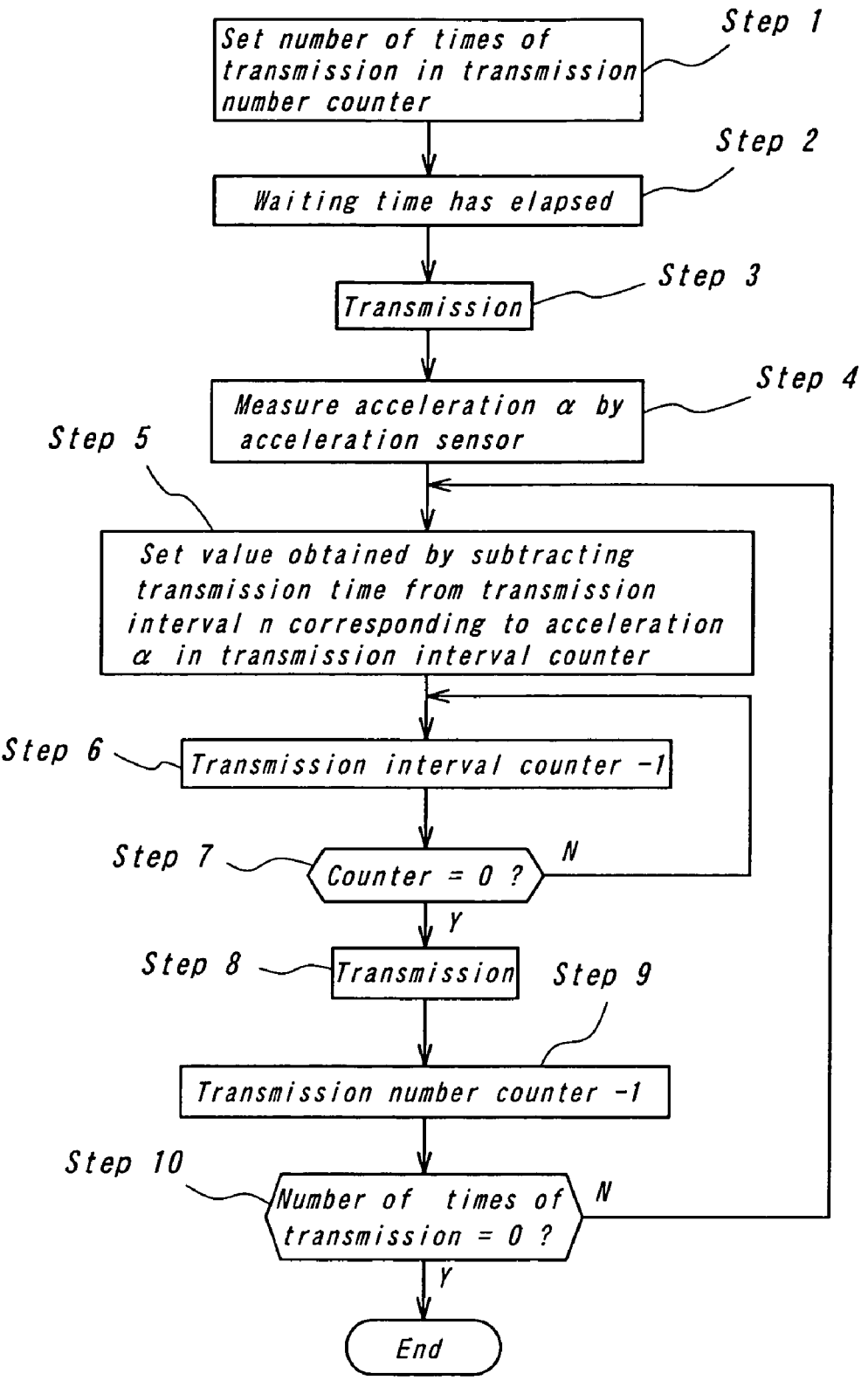
FIG. 4 is a flowchart for explaining one example of an actual operation of a wheel condition monitoring system in accordance with a first embodiment.

FIG. 4 is a flowchart for explaining one example of an actual operation of the wheel condition monitoring system in accordance with the present invention. Hereunder, the wheel condition monitoring system of this embodiment is explained by following the flowchart shown in FIG. 4.

First, the number of times of transmission for sending one same data determined by the pressure sensor etc. is set in a transmission number counter (Step 1). After waiting time set for each transmitter has elapsed (Step 2), the data determined by the pressure sensor etc. are first transmitted to the receiver together with the ID of transmitter (Step 3).

The reason why the first transmission is performed after the waiting time set for each transmitter has elapsed is that if the first transmission is performed at the same time from a plurality of transmitters, these transmissions overlap with each other, so that the first signal cannot be received at all by one receiver. Also, as the number of times of transmission to be set, a value of about 2 to 10 is selected in advance considering the tire diameter, vehicle speed, etc. according to the type of vehicle to which this system is applied. If the number of times of transmission becomes large, the probability of success of transmission and reception increases, but on the other hand, the run-down of battery for transmitter becomes heavy. Therefore, a proper value must be set based on past experiences.

Next, the acceleration a of a rotating tire is measured by the acceleration sensor (Step 4), and a value obtained by subtracting transmission time from the transmission interval n corresponding to the measured acceleration a is set in a transmission interval counter (Step 5). The method for determining the transmission interval corresponding to acceleration a is explained later by giving one example. Here, the transmission interval does not mean an interval between the finish of transmission of certain data and the start of transmission of next data, but means an interval between the start time of transmission of certain data including data transmission time and the start time of transmission of next data.

Next, 1 is deducted from the value of transmission interval counter (Step 6), and it is judged whether or not the value of transmission interval counter is 0 (Step 7). As the result of judgment, if the value of transmission interval counter is not 0, the control returns to the point between Step 5 and Step 6, and operations in Step 6 and Step 7 are repeated. As the result of judgment, if the value of transmission interval counter is 0, the data of pressure etc. are transmitted (Step 8). The transmitted data are transmitted as data of, for example, 48 bits in which the transmitter ID and the pressure data, temperature data, and acceleration data are connected in a serial form.

Next, 1 is deducted from the value of transmission number counter (Step 9), and it is judged whether or not the value of transmission number counter is 0 (Step 10). As the result of judgment, if the value of transmission number counter is not 0, the control returns to the point between Step 4 and Step 5, and operations in Step 5 to Step 10 are repeated, by which the transmission of the same data is repeated. As the result of judgment, if the value of transmission number counter is 0, the transmission of one same data finishes to prepare for the transmission of next data.

The above-described operations in the wheel condition monitoring system of this embodiment are carried out within the control circuit 5 of the transmitter 1. Thereby, the system can be configured so that the data of tire pressure etc. are transmitted to the receiver 11 at intervals according to the rotation speed of wheel.

Although as the method for determining the transmission interval corresponding to the acceleration a, various methods are possible, it is preferable that time for one rotation of wheel be determined from the acceleration determined by the acceleration sensor from Table 1, and a value obtained by dividing that time by (number of times of transmission−1) be an integer so that all numbers of times of transmissions set during this one rotation can be performed. For example, if the number of times of transmission is 5 and the value of acceleration sensor is 42 (G), referring to Table 1, the transmission interval is preferably set so that transmission interval=time for one rotation/(number of times of transmission−1)=147.8/4=36.95≈37 (ms). Needless to say, if the size etc. of tire change, the data in Table 1 changes accordingly, so that data matching the actual tire must be used.

Also, as another example of the method for determining the transmission interval corresponding to the acceleration a, it is also preferable that as shown below, a range be set in the rotation speed, and a fixed transmission interval be set for each of the set range. In the following example, the range is set and indicated according to the vehicle speed for ease of explanation. However, as is apparent from the above-described Table 1, the vehicle speed correlates with the rotation speed of wheel, so that it is clear that the same as in the case where the range is set in the rotation speed is true. Also, the number of times of transmission is taken as M. Further, it is assumed that the vehicle speed is not equal to or higher than 300 km/h.

(a) Vehicle speed: 25 km/h or lower
  Acceleration a<10 (G)→Time for one rotation: 300 (ms)
  Transmission interval=300/(M−1) (ms)
(b) Vehicle speed: 25 km/h to 50 km/h
  0 (G)<Acceleration a<40 (G)→Time for one rotation corresponding to 40 (G): 150 (ms)
  Transmission interval=150/(M−1) (ms)
(c) Vehicle speed: 50 km/h to 100 km/h
  40 (G)<Acceleration a<170 (G)→Time for one rotation corresponding to 170 (G): 75 (ms)
  Transmission interval=75/(M−1) (ms)
(d) Vehicle speed: 100 km/h to 200 km/h
  170 (G)<Acceleration a<680 (G)
  Time for one rotation corresponding to 680 (G): 40 (ms)
  Transmission interval=40/(M−1) (ms)
(e) Vehicle speed: 200 km/h to 300 km/h
  680 (G)<Acceleration a<1500 (G)
  Time for one rotation corresponding to 1500 (G): 25 (ms)
  Transmission interval=25/(M−1) (ms)

In the above-described example, explanation has been given of the measurement of condition such as the pressure in tire. However, it is a matter of course that the wheel condition monitoring system in accordance with the present invention can be employed to measure the condition such as the internal pressure of not only a tire but also a rotatable body. Also, in the above-described example, as the condition to be measured in a tire, pressure, temperature, and acceleration have been given as one example. However, it is a matter of course that other conditions of wheel, for example, data of rim vibrations etc. can also be measured by installing a vibration sensor on the transmitter.

Figure 1:
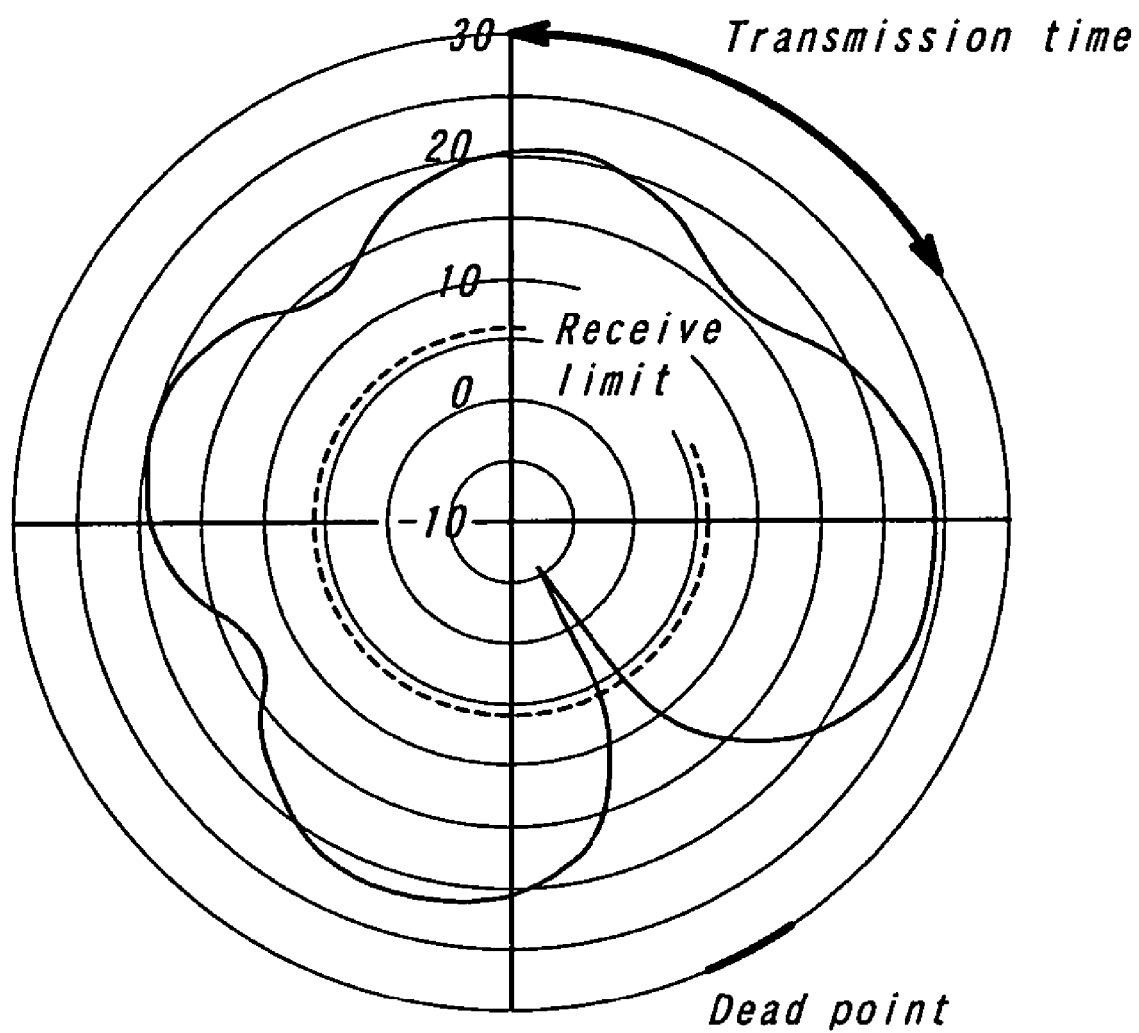
FIG. 1 is a diagram for explaining one example of the send and receive conditions in a conventional wheel condition monitoring system.

Next, of the two embodiments having the above-described common configuration, a second embodiment will be described. In the wheel condition monitoring system of the second embodiment, when the data such as pressure data is sent from the transmitter 1 to the receiver 11, a plurality of times of transmission is performed by combining two transmission intervals of a transmission interval of a first cycle that assumes a high speed range and a transmission interval of a second cycle that assumes a low speed range and is longer than the first cycle, by which the transmission/reception efficiency is enhanced. The embodiment was achieved by the study described below. In this consideration, the design upper limit speed was assumed to be 300 km/h. Also, in the explanation given below, the term "transmission position" means the rotation position of wheel during the time when data is sent from the wheel during rotation, and is the rotation position described as "transmission time" in FIG. 1.

(A) Speed 0 (Stop Time)

The reception probability at the stop time is the angle of dead point/360 because the rotation angle during transmission time is 0. Therefore, even if the transmission time and the number of times of transmission are controlled, no improvement can be expected.

(B) High Speed Range (180 to 300 km/h)

The time required for one rotation of tire in this range is as short as 22 to 40 ms. In order that, of the succeeding two transmissions, even if the transmission position of the first transmission overlaps with the dead point, the transmission position of the later transmission does not overlap with the dead point appearing after one cycle, a shorter transmission interval (for example, 10 to 16 ms) easily improves the reception probability.

(C) Low speed range (30 km/h or Lower)

The low speed range is a range close to the stop time, for example, being 30 km/h. The time required for one rotation of tire is 250 ms. In this region, in order that, of the succeeding two transmissions, even if the transmission position of the first transmission overlaps with the dead point, the transmission position of the later transmission does not overlap with the same dead point in the same cycle, the transmission interval should be as long as possible. On the other hand, if the transmission interval is increased, the consumption of stand-by power during this time increases, and hence the run-down of battery cannot be restrained. Therefore, it is considered that three times of transmission at transmission intervals of 100 to 150 ms are desirable. Here, the transmission interval does not mean an interval between the finish of transmission of certain data and the start of transmission of next data, but means an interval between the start time of transmission of certain data including data transmission time and the start time of transmission of next data.

(D) Medium Speed Range (30 to 180 km/h)

The medium speed range can be handled by combining transmission patterns in the low speed range and the high speed range without taking individual measures.

From the above considerations, it is thought that the two transmission intervals of the transmission interval of the first cycle that assumes the high speed range and the transmission interval of the second cycle that assumes the low speed range and is longer than the first cycle are advantageous in efficiently increasing the reception probability. Concretely, a first cycle and a second cycle as described below are possible. The example given below is one example, and it is apparent that the present invention is not limited to this example.

(a) First Cycle
(1) The case where the number of times of transmission in the first cycle is two (in the case where during two times of data transmission, one transmission interval in the first cycle T1 is present):

The first cycle assumes 300 km/h, which is the highest speed in design. Assuming that the tire size in which one rotation cycle of tire is the shortest is a size of 205/45ZR16 (external shape: 588 mm), which is the final external shape in accordance with the ZR standard, the time for one rotation of wheel in this case is 22.2 ms (300 km/h). Considering that the transmission time is 8 ms, a transmission interval T1 of 8 to 22 ms is proper.

$$8 \text{ ms} < T1 < 22 \text{ ms}$$

The reason for this is that in order that both of the transmission positions of both transmissions do not overlap with the dead point, the transmission interval must be equal to or shorter than 22 ms.

(2) The case where the number of times of transmission in the first cycle is three (in the case where during three times of data transmission, two transmission intervals in the first cycle T11 and T12 are present):

In order that the third data transmission does not overlap with the first data transmission, the transmission intervals in the first cycle T11 and T12 of 8 to 11 ms are proper.

$$8 \text{ ms} < T11, T12 < 11 \text{ ms}$$

Also, in the case where the first transmission interval in the first cycle T11 and the second transmission interval in the first cycle T12 are different from each other, the probability that the transmission position of any transmission deviates from the dead point can be increased when various vehicle speed conditions and various dead point distribution conditions are considered, so that $$T12 = T11 + \theta$$

is preferable.

(b) Second Cycle
(1) The case where the number of times of transmission in the second cycle is two (in the case where between two data transmission groups of a predetermined number of times in the first cycle, one transmission interval in the second cycle T2 is present)

The second cycle is set to increase the reception probability in a low speed range, and, as described above, is preferably 100 to 150 ms.

The following relation is possible.

$$T2 = T1 \times (N + 0.5)$$

In this equation, by making N an integer, and selecting N suitably, the value of T2 can be made 100 to 150 ms.

(2) The case where the number of times of transmission in the second cycle is three (in the case where between three data transmission groups of a predetermined number of times in the first cycle, two transmission intervals in the second cycle T21, T22 are present):

The following relations are possible.

$$T21 = T1 \times (N + 0.3), \text{ and}$$

$$T22 = T1 \times (N + 0.6)$$

In this case as well, by making N an integer, and selecting N suitably, the values of T21 and T22 can be made 100 to 150 ms.

Figure 5:
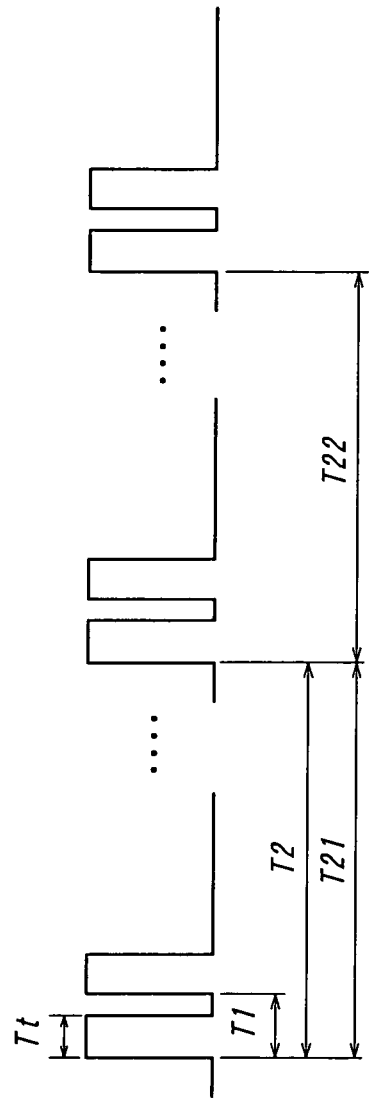
FIG. 5 is a diagram for explaining one example of a transmission pattern in a wheel condition monitoring system in accordance with a second embodiment.
Figure 6:
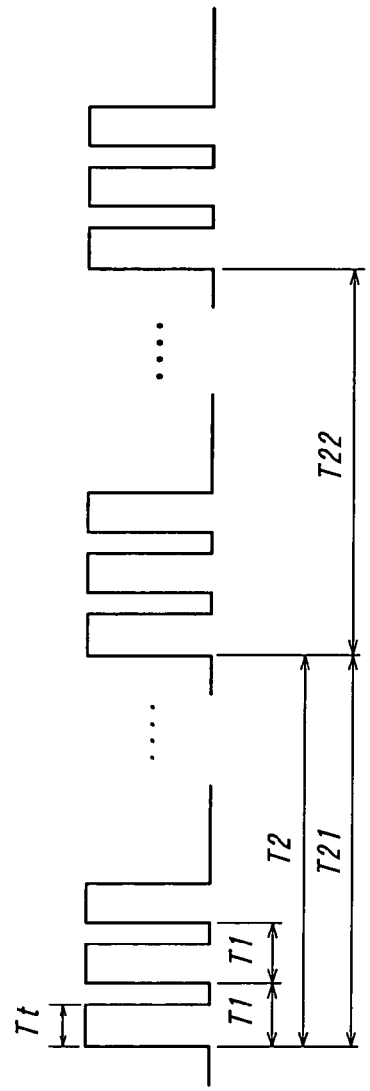
FIG. 6 is a diagram for explaining another example of a transmission pattern in a wheel condition monitoring system in accordance with a second embodiment.
Figure 7:
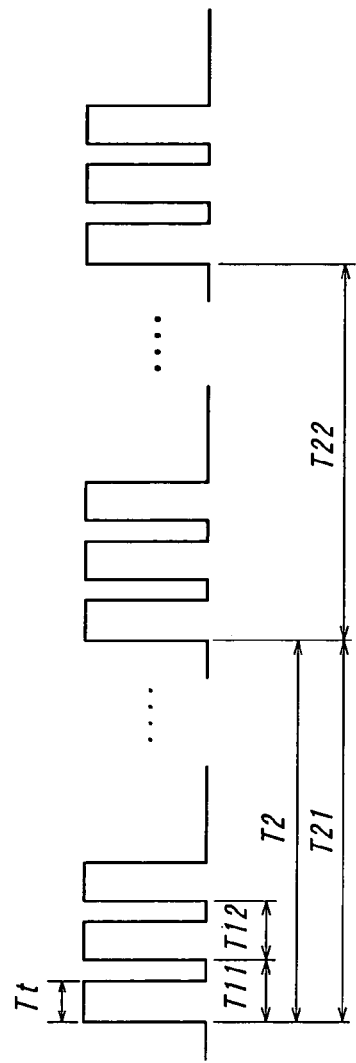
FIG. 7 is a diagram for explaining still another example of a transmission pattern in a wheel condition monitoring system in accordance with a second embodiment.

Examples of actual transmission patterns determined based on the above consideration are shown in FIGS. 5 to 7 as Propositions 1 to 6. All of these propositions show actual values that can be adopted as the first and second cycles in the wheel condition monitoring system of the second embodiment.

In FIG. 5, as Proposition 1, an example is shown in which in the first cycle, data transmissions are performed two times (one transmission interval in the first cycle is T1), and in the second cycle, two data transmissions in the first cycle are performed two times (one transmission interval in the second cycle is T2), and, as Proposition 2, an example is shown in which in the first cycle, data transmissions in the first cycle are performed two times (one transmission interval in the first cycle is T1), and in the second cycle, two data transmissions in the first cycle are performed three times (two different transmission intervals in the second cycle are T21 and T22).

In FIG. 6, as Proposition 3, an example is shown in which in the first cycle, data transmission is performed three times (the two same transmission intervals in the first cycle are T1), and in the second cycle, three data transmissions in the first cycle are performed two times (one transmission interval in the second cycle is T2), and as proposition 4, an example is shown in which in the first cycle, data transmission is performed three times (the two same transmission intervals in the first cycle are T1), and in the second cycle, three data transmissions in the first cycle are performed three times (two different transmission intervals in the second cycle are T21 and T22).

In FIG. 7, as Proposition 5, an example is shown in which in the first cycle, data transmission is performed three times (two different transmission intervals in the first cycle are T11 and T12), and in the second cycle, three data transmissions in the first cycle are preformed two times (one transmission interval in the second cycle is T2), and as Proposition 6, in the first cycle, data transmission is performed three times (two different transmission intervals in the first cycle are T11 and T12), and in the second cycle, three data transmissions in the first cycle are performed three times (two different transmission intervals in the second cycle are T21 and T22).

In the above-described examples, the measurement of conditions such as pressure in tire has been explained. However, it is a matter of course that the wheel condition monitoring system in accordance with the present invention can be employed to measure the conditions of not only a wheel but also other rotatable bodies. Also, in the above-described example, pressure, temperature, and acceleration have been cited as examples of conditions to be measured in a tire. However, it is a matter of course that the conditions of wheel other than these conditions, for example, the data of rim vibrations can also be measured by installing a vibration sensor on the transmitter.

INDUSTRIAL APPLICABILITY

As is apparent from the above description, according to the present invention, even if a dead point at which transmission and reception are impossible is present, the probability that transmission and reception can be accomplished by several times of transmission can be increased, and the system can perform its functions stably.

The invention claimed is:

1. A wheel condition monitoring system having a transmitter which is installed on an individual rotatable wheel to transmit a condition of the wheel and a receiver which is installed on the vehicle body side to receive the condition of the wheel sent from said transmitter, wherein a rotational speed of the wheel is detected, and data indicating the condition of the wheel is sent from said transmitter to said receiver at intervals proportional to the detected rotational speed of the wheel.

2. The wheel condition monitoring system according to claim 1, wherein when said receiver receives a plurality of pieces of data sent from said transmitter installed on each of a plurality of wheels, first data transmission from said transmitter is performed after each waiting time set for each transmitter has elapsed.

3. The wheel condition monitoring system according to claim 2, wherein said transmitter is provided with an acceleration sensor, and the rotation speed of wheel is determined from the measurement value of said acceleration sensor.

4. The wheel condition monitoring system according to claim 2, wherein a transmission number counter is provided; and the number of times of transmission, which has been determined in advance, is set in said transmission number counter, the number of times of transmission is counted until the set number of times of transmission becomes zero, and transmission is finished at the time when the number of times of transmission becomes zero.

5. The wheel condition monitoring system according to claim 1, wherein said transmitter is provided with an acceleration sensor, and the rotation speed of wheel is determined from the measurement value of said acceleration sensor.

6. The wheel condition monitoring system according to claim 5, wherein a transmission interval counter is provided; and a transmission interval corresponding to acceleration determined by said acceleration sensor is set in said transmission interval counter, the transmission interval is counted until the set transmission interval value becomes zero, and transmission is performed at the time when said value becomes zero, by which transmission is achieved at intervals in accordance with the rotation speed of wheel.

7. The wheel condition monitoring system according to claim 6, wherein a transmission number counter is provided; and the number of times of transmission, which has been determined in advance, is set in said transmission number counter, the number of times of transmission is counted until the set number of times of transmission becomes zero, and transmission is finished at the time when the number of times of transmission becomes zero.

8. The wheel condition monitoring system according to claim 5, wherein a transmission number counter is provided; and the number of times of transmission, which has been determined in advance, is set in said transmission number counter, the number of times of transmission is counted until the set number of times of transmission becomes zero, and transmission is finished at the time when the number of times of transmission becomes zero.

9. The wheel condition monitoring system according to claim 1, wherein a transmission number counter is provided; and the number of times of transmission, which has been determined in advance, is set in said transmission number counter, the number of times of transmission is counted until the set number of times of transmission becomes zero, and transmission is finished at the time when the number of times of transmission becomes zero.

10. A wheel condition monitoring system having a transmitter which is installed on an individual rotatable wheel to transmit a condition of the wheel and a receiver which is installed on the vehicle body side to receive the condition of the wheel sent from said transmitter, wherein data that indicate the condition of wheel are sent a predetermined number of times at a transmission interval of a first cycle that assumes a high speed range, and also data transmission of a predetermined number of times at the transmission interval of the first cycle is repeated a predetermined number of times at a transmission interval of a second cycle that assumes a low speed range and is longer than the first cycle.

11. The wheel condition monitoring system according to claim 10, wherein when said receiver receives a plurality of pieces of data sent from said transmitter installed on each of a plurality of wheels, first data transmission from said transmitter is performed after each waiting time set for each transmitter has elapsed.

12. The wheel condition monitoring system according to claim 11, wherein said system is configured so that in the case where the number of times of transmission in the first cycle is 2 or more, the first transmission interval in the first cycle is not the same as the second transmission interval in the first cycle.

13. The wheel condition monitoring system according to claim 11, wherein said system is configured so that in the case where the number of times of transmission in the second cycle is 2 or more, the first transmission interval in the second cycle is not the same as the second transmission interval in the second cycle.

14. The wheel condition monitoring system according to claim 10, wherein said system is configured so that in the case where the number of times of transmission in the first cycle is 2 or more, the first transmission interval in the first cycle is not the same as the second transmission interval in the first cycle.

15. The wheel condition monitoring system according to claim 14, wherein said system is configured so that in the case where the number of times of transmission in the second cycle is 2 or more, the first transmission interval in the second cycle is not the same as the second transmission interval in the second cycle.

16. The wheel condition monitoring system according to claim 10, wherein said system is configured so that in the case where the number of times of transmission in the second cycle is 2 or more, the first transmission interval in the second cycle is not the same as the second transmission interval in the second cycle.

* * * * *